United States Patent
Karaoguz et al.

(10) Patent No.: US 8,745,531 B2
(45) Date of Patent: Jun. 3, 2014

(54) MEDIA PROCESSING SYSTEM SUPPORTING AUTOMATED PERSONAL CHANNEL CONSTRUCTION BASED ON USER PROFILE AND PRE-SELECTION

(75) Inventors: Jeyhan Karaoguz, Irvine, CA (US); James D. Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/672,251

(22) Filed: Sep. 26, 2003

(65) Prior Publication Data

US 2004/0117829 A1 Jun. 17, 2004

Related U.S. Application Data

(60) Provisional application No. 60/450,163, filed on Feb. 25, 2003, provisional application No. 60/432,472, filed on Dec. 11, 2002, provisional application No. 60/443,894, filed on Jan. 30, 2003.

(51) Int. Cl.
*G06F 3/048* (2013.01)
*G06F 3/00* (2006.01)
*H04N 7/173* (2011.01)

(52) U.S. Cl.
USPC .............. 715/811; 725/46; 725/98; 725/100

(58) Field of Classification Search
USPC .................... 715/811, 98; 725/98, 46, 100
See application file for complete search history.

(56) References Cited

U.S. PATENT DOCUMENTS

| | | | | |
|---|---|---|---|---|
| 5,758,259 A * | 5/1998 | Lawler | ............................. | 725/45 |
| 5,838,314 A * | 11/1998 | Neel et al. | ........................ | 725/8 |
| 5,945,988 A * | 8/1999 | Williams et al. | .............. | 715/747 |
| 6,088,722 A * | 7/2000 | Herz et al. | .................... | 709/217 |
| 6,233,428 B1 | 5/2001 | Fryer | | |
| 6,324,338 B1 * | 11/2001 | Wood et al. | ................... | 386/291 |
| 7,003,795 B2 | 2/2006 | Allen | | |
| 7,065,778 B1 * | 6/2006 | Lu | .................................. | 725/98 |
| 2001/0021994 A1 * | 9/2001 | Nash | .............................. | 725/42 |
| 2002/0016971 A1 | 2/2002 | Berezowski | | |
| 2002/0053084 A1 * | 5/2002 | Escobar et al. | ................. | 725/47 |

(Continued)

FOREIGN PATENT DOCUMENTS

GB WO 0040026 * 7/2000 ............. H04N 7/173

OTHER PUBLICATIONS

Michael Ehrmantraut, Theo Harder, Hartmut Wittig, Ralf Steinmetz The presonal electronic program guide—towards the pre-selection of individual tv programs Copyright 1996 ACM pp. 243-250.*

(Continued)

*Primary Examiner* — Andrea Long
(74) *Attorney, Agent, or Firm* — Garlick & Markison

(57) ABSTRACT

Systems and methods supporting automatic selection of media according to a user profile are disclosed. An embodiment of the present invention may automatically select media matching user-defined characteristics in a user profile, and may provide information identifying the selected media to a user via a user interface. The user interface may be displayed as one or more media channels, where a portion of each media channel may comprise information identifying the automatically selected media. The user may then access the automatically selected media via the user interface. The media selected may one or more of audio, still images, video, real-time video, and data.

20 Claims, 13 Drawing Sheets

(56) References Cited

U.S. PATENT DOCUMENTS

| | | | |
|---|---|---|---|
| 2002/0054086 A1* | 5/2002 | Van Oostenbrugge et al. | 345/744 |
| 2002/0080169 A1* | 6/2002 | Diederiks | 345/744 |
| 2002/0104099 A1* | 8/2002 | Novak | 725/136 |
| 2002/0144267 A1* | 10/2002 | Gutta et al. | 725/46 |
| 2002/0152117 A1* | 10/2002 | Cristofalo et al. | 705/14 |
| 2003/0023977 A1* | 1/2003 | Brown et al. | 725/58 |
| 2003/0115585 A1 | 6/2003 | Barsness | |
| 2003/0229898 A1* | 12/2003 | Babu et al. | 725/87 |
| 2004/0003040 A1 | 1/2004 | Beavers | |

OTHER PUBLICATIONS

Bernard Merialdo, Kyung Tak Lee, Dario Luparello, Jeremie Roudaire Automatic Construction of Personalized TV News programs ACM Mulitimedia '99 pp. 323-331.*

* cited by examiner

| CHANNEL LINE UP | <<1PM | 2PM | HOUR, DAY ... | 6PM | 7PM>> |
|---|---|---|---|---|---|
| FAMILY VACATIONS | | | | | |
| KID's SPORTS | | | | | |
| ... | | | | | |
| VACATION in ALASKA VIDEO  802 | | | Normal Estimated Delivery Time: 2 hrs 13 min Cost: 59c (without Queuing) | Showing All Day (48 Min), Earliest Order Time: 4:00PM MPEG-2 1.5 Mbps | |
| VACATION in ALASKA VIDEO  803 | | | Express Estimated Delivery Time: 18 min Cost: $1.2 (with Queuing) | Showing All Day (48 Min), Earliest Order Time: 4:00PM MPEG-2 4 Mbps | |
| VACATION in ALASKA VIDEO  804 | | | Overnight Delivery: Avail Nxt Morning Cost: 5c (Server Stored) | Showing All Day (48 Min), Earliest Order Time: 4:00PM MPEG-2 19 Mbps | |

MEDIA PROCESSING SYSTEM SUPPORTING AUTOMATED PERSONAL CHANNEL CONSTRUCTION BASED ON USER PROFILE AND PRE-SELECTION

CROSS-REFERENCE TO RELATED APPLICATIONS/INCORPORATION BY REFERENCE

This application makes reference to, claims priority to, and claims the benefit of U.S. Provisional Patent Application 60/450,163, entitled "Media Processing System Supporting Automated Personal Channel Construction Based On User Profile And Pre-Selection", filed Feb. 25, 2003, U.S. Provisional Application Ser. No. 60/432,472, entitled "Personal Inter-Home Media Exchange Network", filed Dec. 11, 2002, and U.S. Provisional Application Ser. No. 60/443,894, entitled "Personal Access And Control Of Media Peripherals On A Media Exchange Network", filed Jan. 30, 2003, the complete subject matter of which are hereby incorporated herein by reference, in their entirety.

In addition, the applicants hereby incorporate the complete subject matter herein by reference, in their entirety, of U.S. Provisional Patent Application Ser. No. 60/457,179, entitled "Server Architecture Supporting A Personal Media Exchange Network", filed Mar. 25, 2003, U.S. patent application Ser. No. 10/657,390, entitled "Personal Inter-Home Media Exchange Network", filed Sep. 8, 2003, and U.S. patent application Ser. No. 10/660,267, entitled "Personal Access And Control Of Media Peripherals On A Media Exchange Network", filed Sep. 11, 2003.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

TV broadcast channels are provided in several ways today. For example, a commercial TV broadcast station typically provides a TV broadcast channel comprising certain pre-programmed segments (i.e., television shows, news, weather, sports, movies, commercials, etc.) scheduled to be broadcast at certain times. Similarly, a cable TV company provides certain cable TV channels comprising certain pre-programmed segments (i.e., cable shows, news, weather, sports, movies, commercials, etc.) scheduled to be broadcast at certain times. A commercial radio broadcast station provides a radio broadcast channel comprising certain pre-programmed radio segments (i.e., music, news, weather, traffic, commercials, talk shows, etc.) scheduled to be broadcast at certain times.

Each of these sources of programmed segments are pre-programmed and scheduled by a third party, independent of the consumer, but made available to the consumer. A consumer may view a pre-programmed segment at the scheduled broadcast time or may choose to record the segment for later consumption using, for example, a VCR or audio recorder. The consumer is able to switch from channel to channel and/or possibly indicate to the third party (e.g., a cable channel provider) that certain channels are not wanted. Also, with pay-per-view, a consumer can select certain channels with certain programmed segments to be purchased. Hotels often provide access to in-room movies and video games that a consumer may select using menu functionality on a TV screen. Again, the segments are all pre-programmed, independent of the consumer, by a third party and simply made available to the consumer. The programmed segments may be scheduled to be available at a certain time or may be available to a consumer on demand.

A personal computer (PC) may be used to select and view and/or download information from web sites on the Internet. A particular web site may be considered a channel having pre-programmed information such as articles, video files, audio files, advertisements, etc. A consumer can store a web site address in his "Favorites" menu on his PC in order to be able to find and access the web site again at a later time. The web site information is pre-programmed, independent of the consumer, by a third party and made available to a consumer on his PC via the Internet.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be observed in a system supporting the automatic selection of media according to a user profile. Such a system may comprise a television display to support the consumption of media, a user interface accessible via the television display, a storage that stores media, and server software. The user interface may expose at least one media channel comprising media available for consumption. The storage may be communicatively coupled to the television display, and the storage may have an associated network address. The server software may receive a request identifying at least one of the associated network address and a user identifier, and may respond by automatically selecting media according to a user profile. The user profile may correspond to at least one of the associated network address and a user identifier, and the server software may deliver to the storage, via a communication network, information identifying the selected media, the information for incorporation into the user interface.

The associated network address in an embodiment of the present invention may be one of an Internet protocol (IP) address, a media access control (MAC) address, and an electronic serial number (ESN). The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The communication network may be the Internet. In an embodiment in accordance with the present invention, the selected media may comprise at least one of audio, a still image, video, and data, and the selected media may comprise real-time video.

In an embodiment of the present invention, the consumption may comprise at least one of playing audio, displaying a still image, displaying video, and displaying data. The user profile may correspond to an individual user, and the user profile may comprise at least one of a user interest, an age, a hobby, a gender, a viewing history, a genre, a media type, a media format, a media quality, a time, and a media selection.

Additional aspects of the present invention may be found in a system supporting the automatic selection of media according to a user profile. A system in accordance with the present invention may comprise a user interface displaying at least one media channel comprising media available for consumption, a storage that stores media, the storage having an associated network address, and server software. The server software may automatically select media according to a user profile, and may deliver to the storage, via a communication network, information identifying the selected media, the information for incorporation into the user interface.

In an embodiment of the present invention, the media may comprise at least one of audio, a still image, video, and data, and the media may comprise real-time video. The network address may be one of an Internet protocol (IP) address, a media access control (MAC) address, and an electronic serial number (ESN). Consumption may comprise at least one of playing audio, displaying a still image, displaying video, and displaying data. The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure, and the communication network may be the Internet. The user profile may comprise at least one of a user interest, an age, a hobby, a gender, a viewing history, a genre, a media type, a media format, a media quality, a time, and user selected media. The server software may support anonymous media exchange, the server software may coordinate the delivery of the selected media to the storage, and the server software may be at a location separate from the storage.

Yet another aspect of the present invention may be seen in a method of operating a system supporting the automatic selection of media according to a user profile. Such a method may comprise receiving a user profile from a user, automatically selecting media according to the user profile, communicating to the user information identifying the media, and receiving a request from the user for at least a portion of the identified media. The method may also comprise coordinating the delivery of the at least a portion of the identified media from a source to the user for consumption. In an embodiment of the present invention, the user profile may comprise at least one of a user interest, an age, a hobby, a gender, a viewing history, a genre, a media type, a media format, a media quality, a time, and user selected media. The media may comprises at least one of audio, a still image, video, real-time video, and data, and the consumption may comprise at least one of playing audio, displaying a still image, displaying video, and displaying data. The delivery may use a communication network comprising at least one of a cable infrastructure, a satellite network infrastructure, a digital subscriber line (DSL) infrastructure, an Internet infrastructure, an intranet infrastructure, a wired infrastructure, and a wireless infrastructure. The communication network may be the Internet. In an embodiment of the present invention, the user may be unknown to the source.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a TV guide channel user interface showing several options of a pushed media in accordance with an embodiment of the present invention.

DETAILED DESCRIPTION OF THE INVENTION

Certain embodiments of the present invention relate to the construction of media channels. In particular, certain embodiments of the present invention relate to the construction of personal media channels by a $3^{rd}$ party media provider, on a media exchange network, based on individual consumer information.

Figure 1:
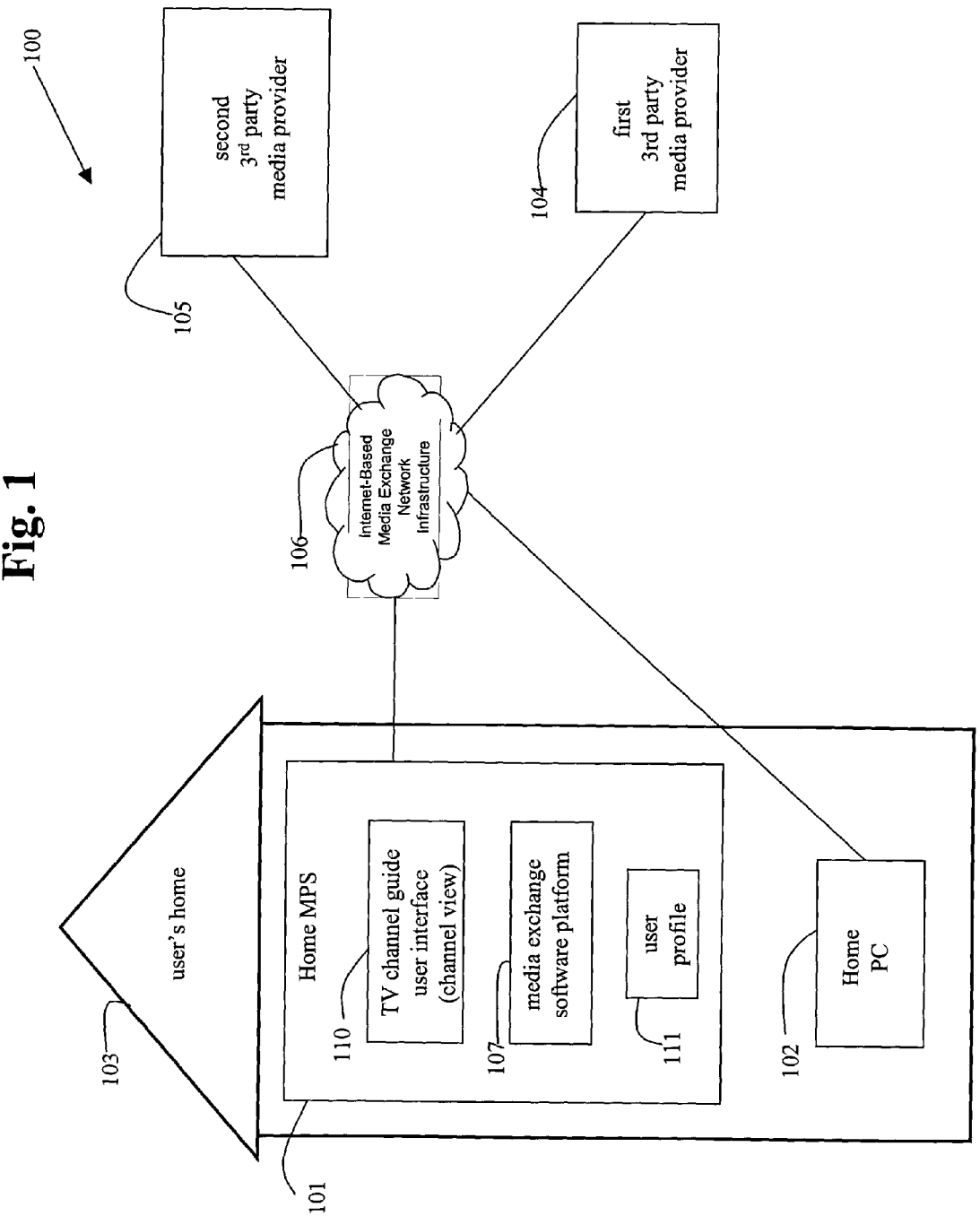
FIG. 1 is a diagram illustrating an embodiment of a media exchange network supporting personal channel construction by a $3^{rd}$ party media provider based on individual consumer information, in accordance with various aspects of the present invention.

FIG. 1 is a diagram illustrating an embodiment of a media exchange network 100 supporting personal media channel construction by a $3^{rd}$ party media provider based on individual consumer information, in accordance with various aspects of the present invention. Specifically, the media exchange network 100 of FIG. 1 is a communication network comprising a home media processing system (MPS) 101 and a home personal computer (PC) 102 at a user's home 103. The media exchange network 100 also comprises a first $3^{rd}$ party media provider 104, and a second $3^{rd}$ party media provider 105 supplying $3^{rd}$ party media content on the media exchange network 100. The $3^{rd}$ party media providers 104, 105 may be, for example, TV broadcasters, cable providers, radio broadcasters, web site providers, or any other possible $3^{rd}$ party media providers, in accordance with various aspects of the present invention.

The media exchange network 100 further comprises an Internet-based media exchange network infrastructure 106 connecting together the home MPS 101, the home PC 102, the first $3^{rd}$ party media provider 104, and the second $3^{rd}$ party media provider 105. The Internet-based media exchange network infrastructure 106 may comprise, for example, cable infrastructure, satellite network infrastructure, DSL infrastructure, Internet infrastructure, intranet, wired infrastructure, and/or wireless infrastructure providing wide area network (WAN) capability, in accordance with various embodiments of the present invention. Each of the elements of the media exchange network infrastructure 106 may be identified by a network protocol address such as, for example, an Internet protocol (IP) address, a media access control (MAC) address, an electronic serial number (ESN), etc. Examples of elements that may be identified by such addresses include MPS 101, the home PC 102, the first $3^{rd}$ party media provider 104, and the second $3^{rd}$ party media provider 105.

The home MPS 101 comprises a media exchange software (MES) platform 107 providing a TV channel guide user interface (a.k.a. "channel view") 110 to a user of the home MPS 101. In accordance with an alternative embodiment of the present invention, the home PC 102 may also comprise a MES platform providing a channel view. The TV channel guide user interface (i.e., "channel view") 110 presents a list of channels versus programmed media content scheduled by time and date, for example. The channel view 110 may be displayed on a TV screen of the MPS 101 or monitor of the PC 102 to a user in order to support channel selection and viewing.

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention.

The MES platform 107 also provides the functional capability for a user of the MPS 101 to generate a user profile 111 using, for example, a remote control that interacts with the MPS 101. Similarly, the MES platform in home PC 102 also provides the functional capability for a user of the home PC 102 to generate a user profile using, for example, a mouse or keyboard that interacts with the PC 102, in accordance with an alternative embodiment of the present invention.

The user profile 111 may comprise a file that includes various information about the user of the MPS 101. For example, the user profile 111 may include various interests of the user, the various interests of the user's kids and spouse, ages of the user and the user's spouse and kids, hobbies of the user, gender of the user and the user's spouse and kids, past history of viewing by the user, a genre, a media type, a media format, a media quality, a time, and a media selection.

Figure 2A:
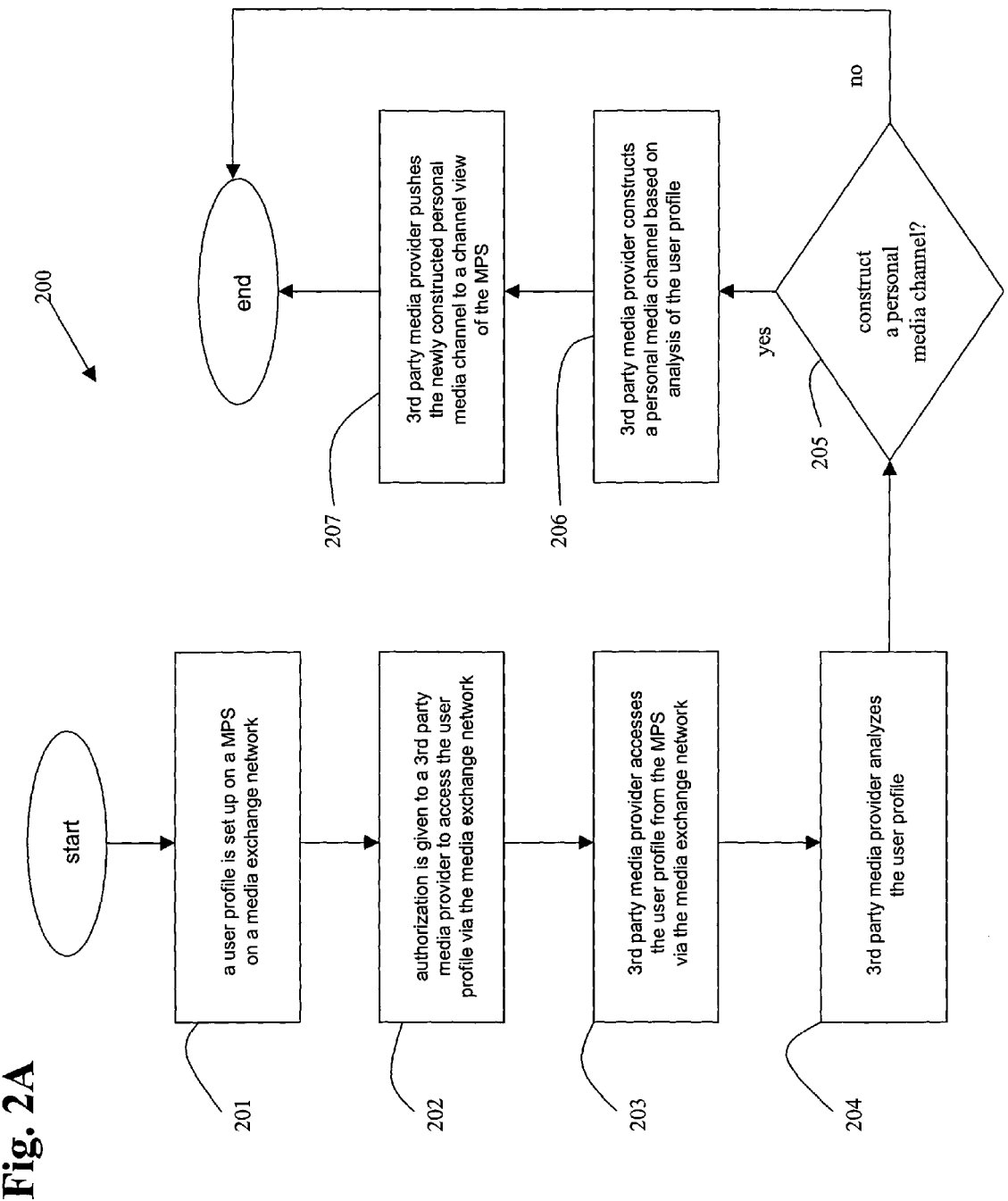
FIG. 2A is a flowchart of an embodiment of a method to provide automated personal channel construction by a $3^{rd}$ party media provider, on the media exchange network of FIG. 1, based on a user profile, in accordance with various aspects of the present invention.

FIG. 2A is a flowchart of an embodiment of a method 200 to provide automated personal channel construction by a $3^{rd}$ party media provider, on the media exchange network 100 based on a user profile 111, in accordance with various aspects of the present invention. In step 201, a user profile is set up on a MPS on a media exchange network. In step 202, authorization is given to a $3^{rd}$ party media provider to access the user profile via the media exchange network. In step 203, the $3^{rd}$ party media provider accesses the user profile from the MPS via the media exchange network. In step 204, the $3^{rd}$ party media provider analyzes the user profile with respect to media content available from the $3^{rd}$ party media provider. In step 205, the $3^{rd}$ party media provider decides whether or not to construct a personal media channel for the user based on the analysis. If the decision is yes, then in step 206, the $3^{rd}$ party media provider constructs a personal media channel for the user based on the results of the analysis. In step 207, the $3^{rd}$ party media provider pushes the newly constructed media channel to a channel view of the MPS.

As an example, a user of the MPS 101 may generate a user profile 111 indicating an interest in fishing. The user gives authorization to the $3^{rd}$ party media provider 105 (e.g., a cable program provider) to access the user profile 111 and push related media content in the form of channels to the MPS 101. Such authorization may be given as a response to a request by the $3^{rd}$ party media provider 105 via the MPS 101 over the media exchange network 100, or as permission initiated by the user via the MPS 101 or PC 102 over the media exchange network 100, in accordance with various embodiments of the present invention.

The $3^{rd}$ party media provider may then access the user profile 111 on the MPS 101 via the media exchange network 100 and analyze the user profile 111 with respect to media content that is available from the $3^{rd}$ party media provider 105. The $3^{rd}$ party media provider 105 may match up the user's interest in fishing with a weekly fishing program provided by the $3^{rd}$ party media provider 105. As a result, the $3^{rd}$ party media provider 105 constructs a personal media channel called "Fishing" for the user, that includes the weekly fishing program, and pushes the newly constructed personal media channel to the channel view 110 of the MPS 101.

The personal media channel is constructed in such a way by the $3^{rd}$ party media provider 105 so as to be compatible with the channel view 110 of the MPS 101. The $3^{rd}$ party media provider 105 may schedule multiple programs into a personal media channel during construction, in accordance with an embodiment of the present invention.

As an alternative, the $3^{rd}$ party media provider 105 may have access to the channel view 110 as well as the user profile 111. In such a case, the $3^{rd}$ party media provider 105 may simply schedule the weekly fishing program to a personal media channel that already exists in the channel view 110, in accordance with an embodiment of the present invention.

As another alternative, the $3^{rd}$ party media provider 105 may construct a personal media channel using media content that is already locally stored on the MPS 101, in accordance with an embodiment of the present invention. For example, the $3^{rd}$ party media provider 105 may detect a digital video of the user's fishing trip stored on the MPS 101. The $3^{rd}$ party media provider 105 may construct a new personal media channel called "Fishing" and schedule both the fishing trip digital video and the weekly fishing program in the new channel.

As a further alternative, the $3^{rd}$ party media provider 105 may construct a new personal media channel called "Fishing" and schedule the weekly fishing program from the $3^{rd}$ party media provider 105 in the newly created personal media channel. Also, the $3^{rd}$ party media provider 105 may schedule, in the same personal media channel, a second weekly fishing program provided by a different $3^{rd}$ party media provider 104 that is also on the media exchange network 100. In such a scenario, the 3$^{rd}$ party media provider 105 may have to arrange with the 3$^{rd}$ party media provider 104, via the media exchange network 100, for access to the second weekly fishing program.

Figure 2B:
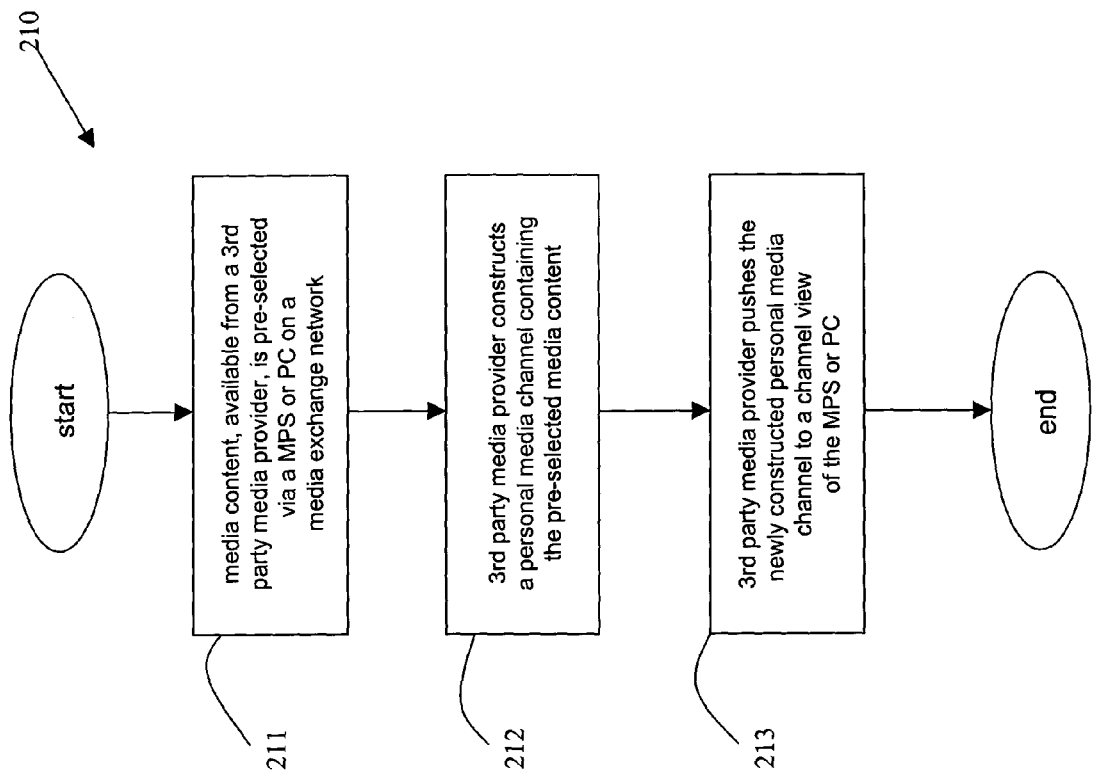
FIG. 2B is a flowchart of an embodiment of a method to provide automated personal channel construction by a $3^{rd}$ party media provider, on the media exchange network of FIG. 1, based on user pre-selection, in accordance with various aspects of the present invention.

As an option, a user of the MPS 101 or the PC 102 may pre-select which media content that they would like a particular 3$^{rd}$ party media provider to push to the MPS 101 in the form of a personal media channel. FIG. 2B is a flowchart of an embodiment of a method 210 to provide automated personal channel construction by a 3$^{rd}$ party media provider on the media exchange network 100, based on user pre-selection, in accordance with various aspects of the present invention. In step 211, media content that is available from a 3$^{rd}$ party media provider is pre-selected by a user via a MPS or PC on the media exchange network. In step 212, the 3$^{rd}$ party media provider constructs a personal media channel containing the pre-selected media content. In step 213, the 3$^{rd}$ party media provider pushes the newly constructed personal media channel to a channel view of the MPS or PC.

For example, a user of the PC 102 may go to a web site on the Internet and specifically request that a weekly fishing program provided by the 3$^{rd}$ party media provider 105 be pushed to the MPS 101 and show up as a channel in the channel view 110. A similar pre-selection may be performed by a user via the MPS 101, interacting with a 3$^{rd}$ party media provider over the media exchange network 100, in accordance with an embodiment of the present invention.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a TV channel guide look-and-feel user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
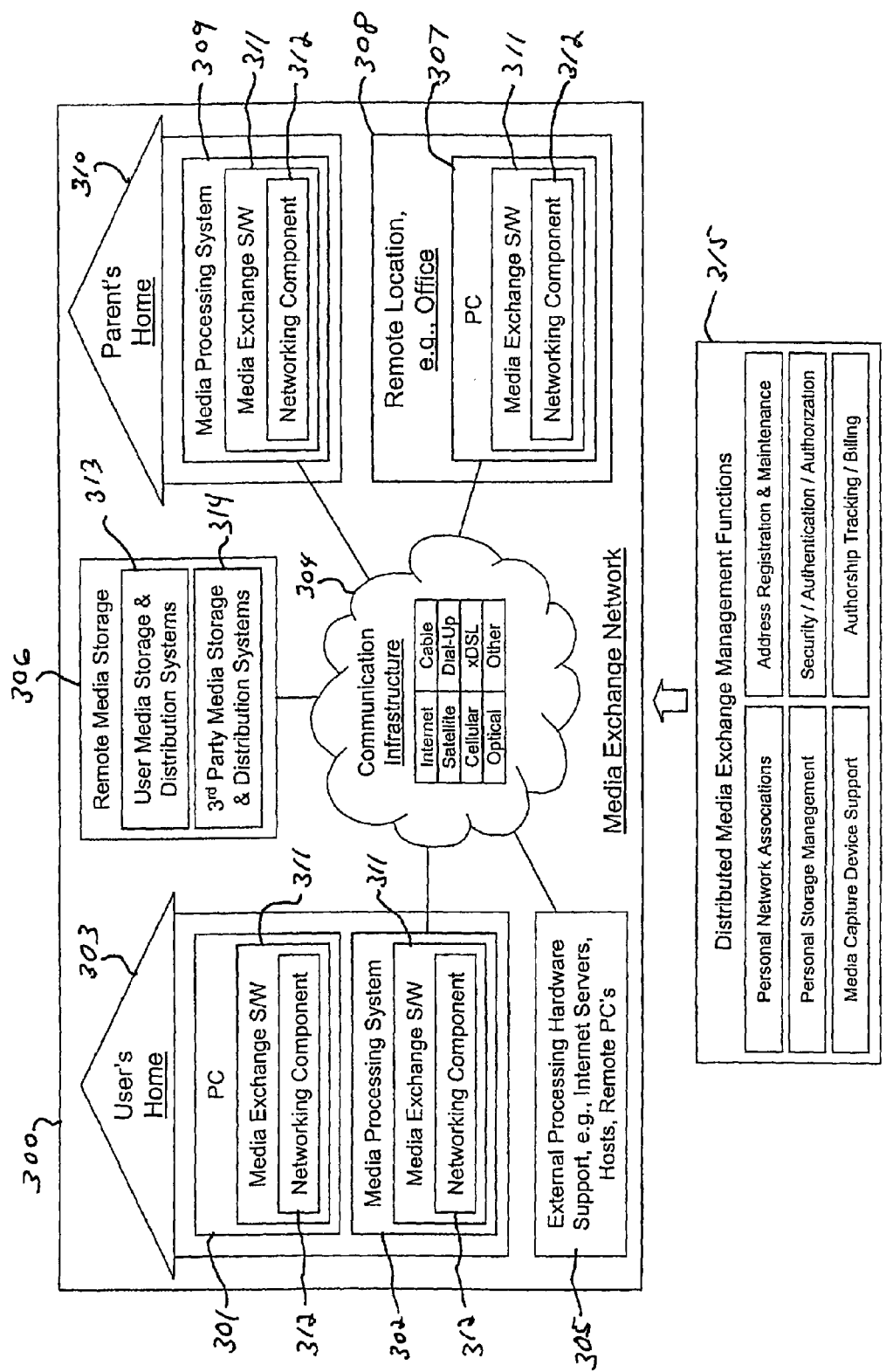
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
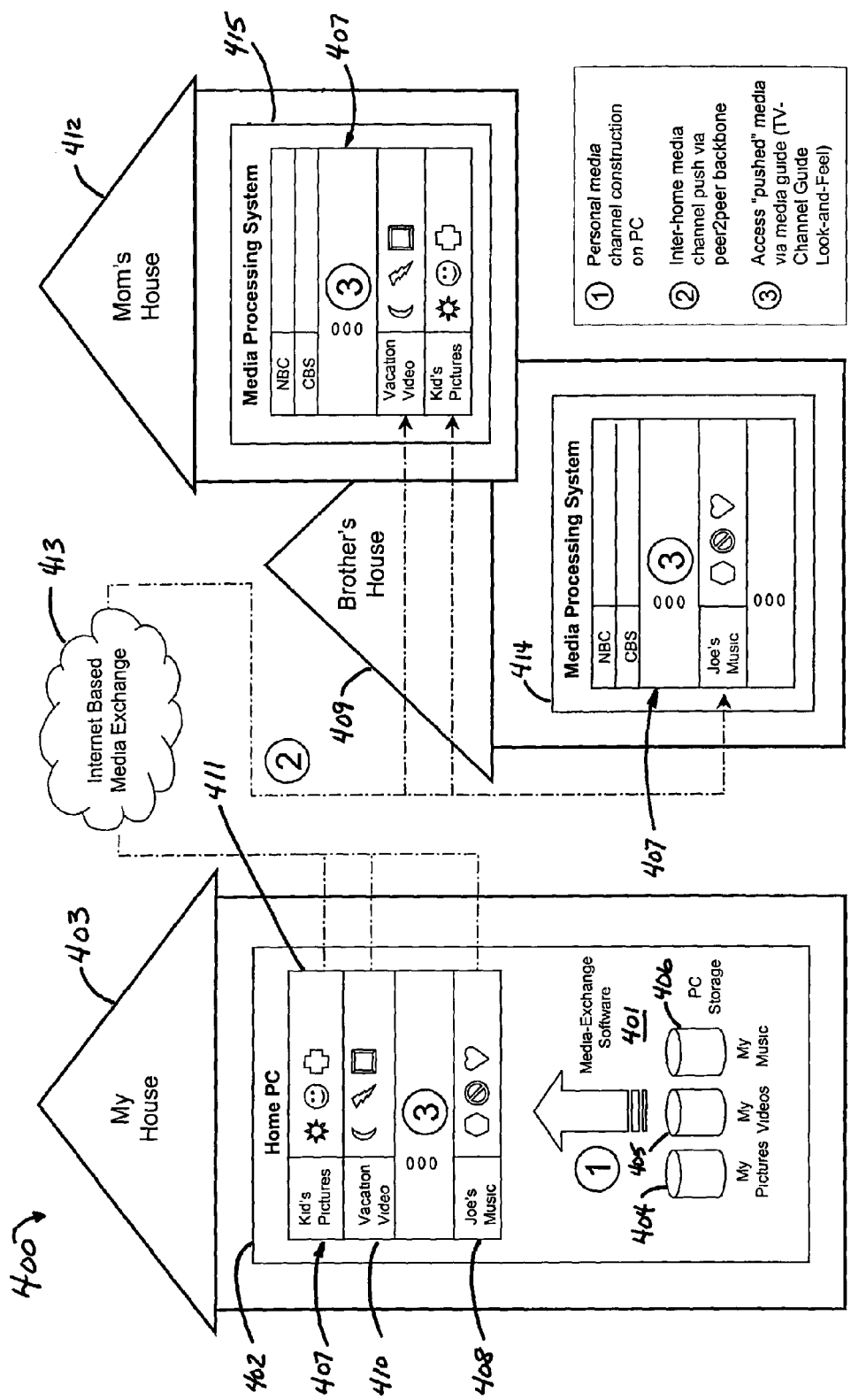
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a TV channel guide look-and-feel user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a TV channel guide look-and-feel user interface 407.

In step 3, brother and/or Mom access the pushed media channels via their respective media processing systems (MPS's) 414 and 415 using their respective MPS TV screens and remote controls.

Figure 5:
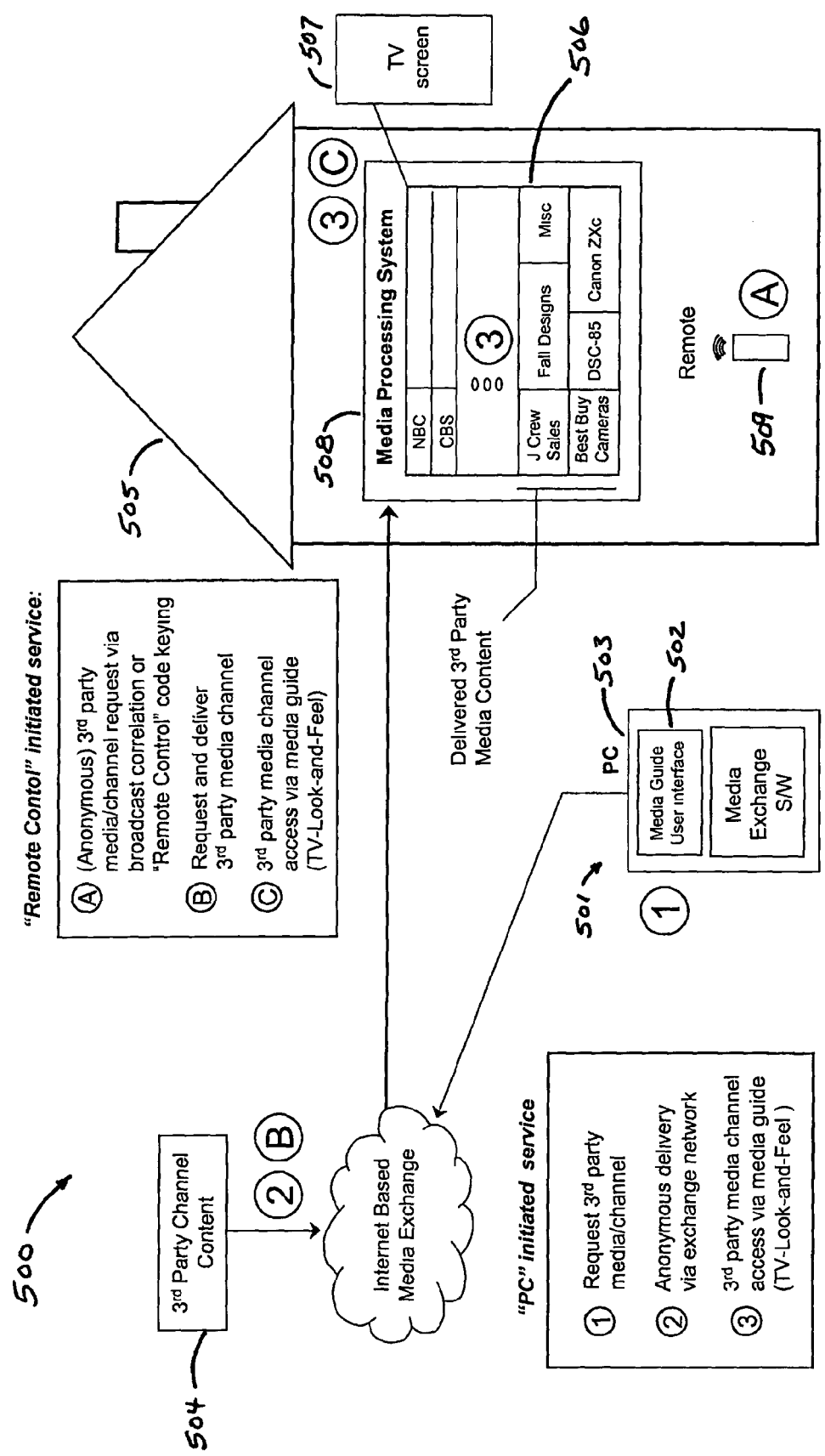
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a TV channel guide look-and-feel user interface 502 on a PC 503. In step 2, an anonymous delivery of the requested third-party channel 504 is made to a second party 505 via the internet-based media exchange network 500. In step 3, the second party 505 accesses the third-party channel 504 using a TV channel guide look-and-feel user interface 506 on a TV screen 507 that is integrated into an MPS 508.

Similarly, in step A, an MPS-initiated third-party request is made by a second party 505 via an internet-based media exchange network 500 using a TV channel guide look-and-feel user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a TV channel guide look-and-feel user interface 502 on a PC 503.

Figure 6:
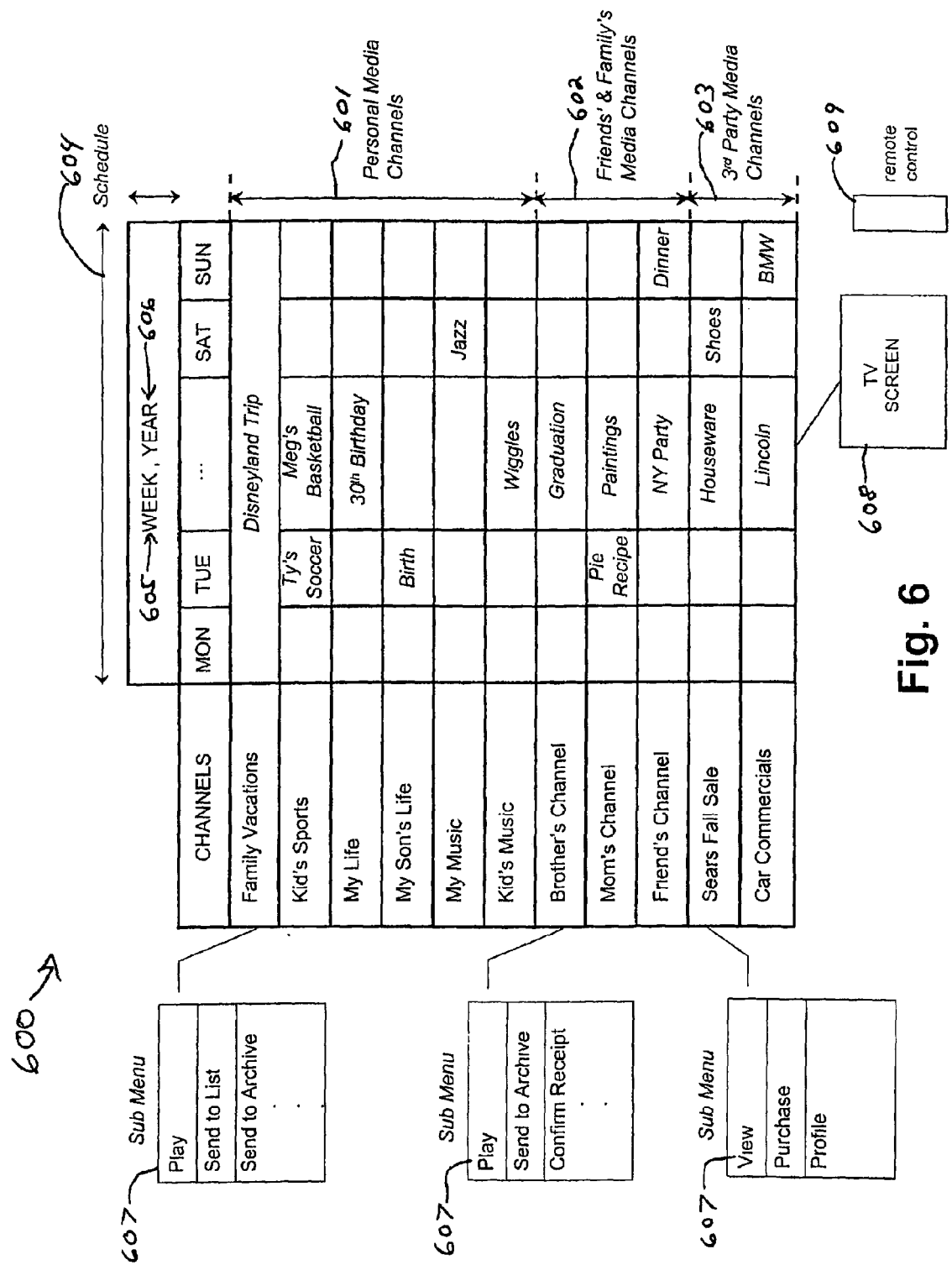
FIG. 6 is an exemplary illustration of a TV guide channel user interface in accordance with an embodiment of the present invention.

FIG. 6 illustrates a TV channel guide user interface 600 in accordance with an embodiment of the present invention. The TV channel guide user interface 600 may be displayed on a TV screen 608 and controlled by a remote control device 609. Also, the TV channel guide user interface 600 may be displayed on a PC monitor and controlled by a keyboard or mouse.

The TV channel guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a submenu 607 allows for selection of certain control and access functions such as "play", "send to list", "send to archive", "confirm receipt", "view", "purchase", and "profile".

Figure 7:
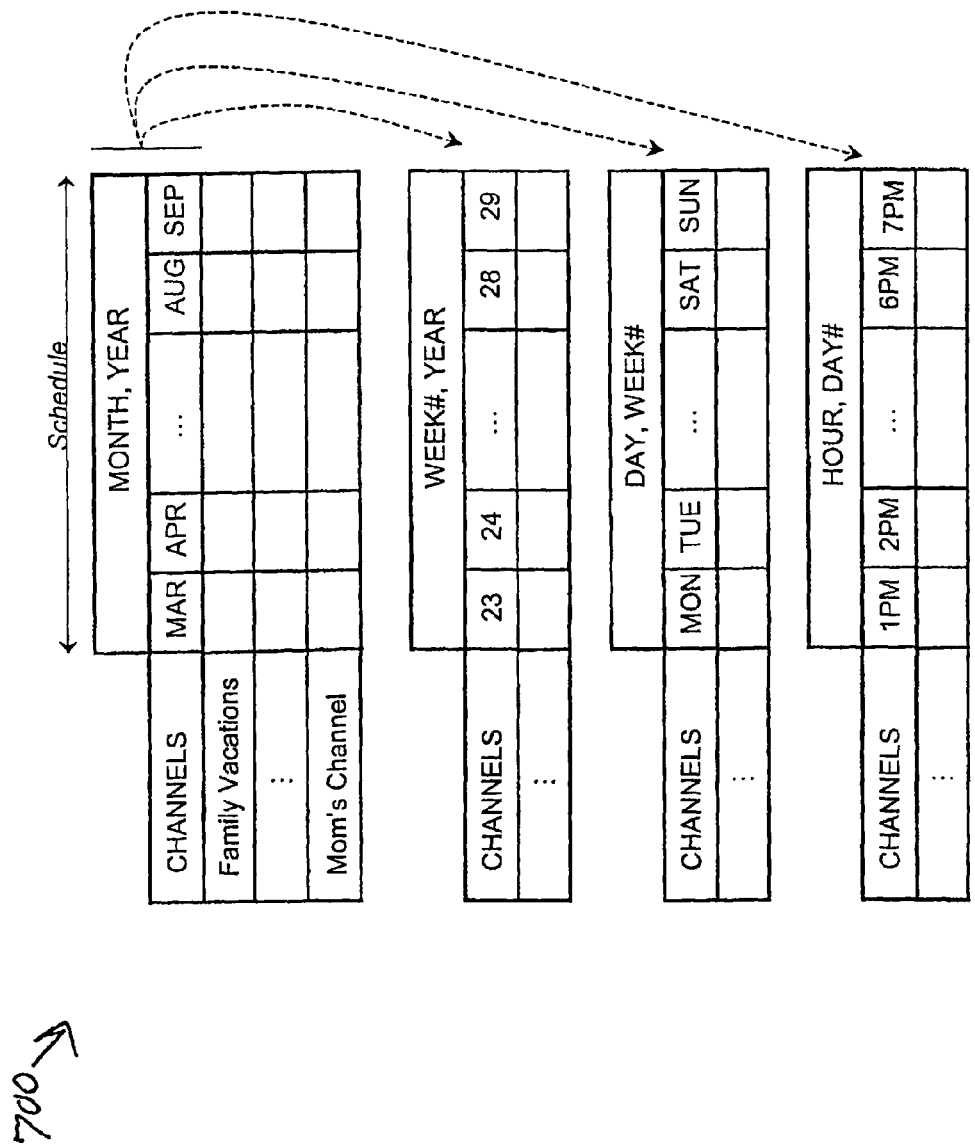
FIG. 7 is an exemplary illustration of several instantiations of a TV guide channel user interface of FIG. 4 in accordance with an embodiment of the present invention.

FIG. 7 illustrates possible multiple instantiations of a TV channel guide user interface 700 in accordance with an embodiment of the present invention. The TV channel guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The TV channel guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
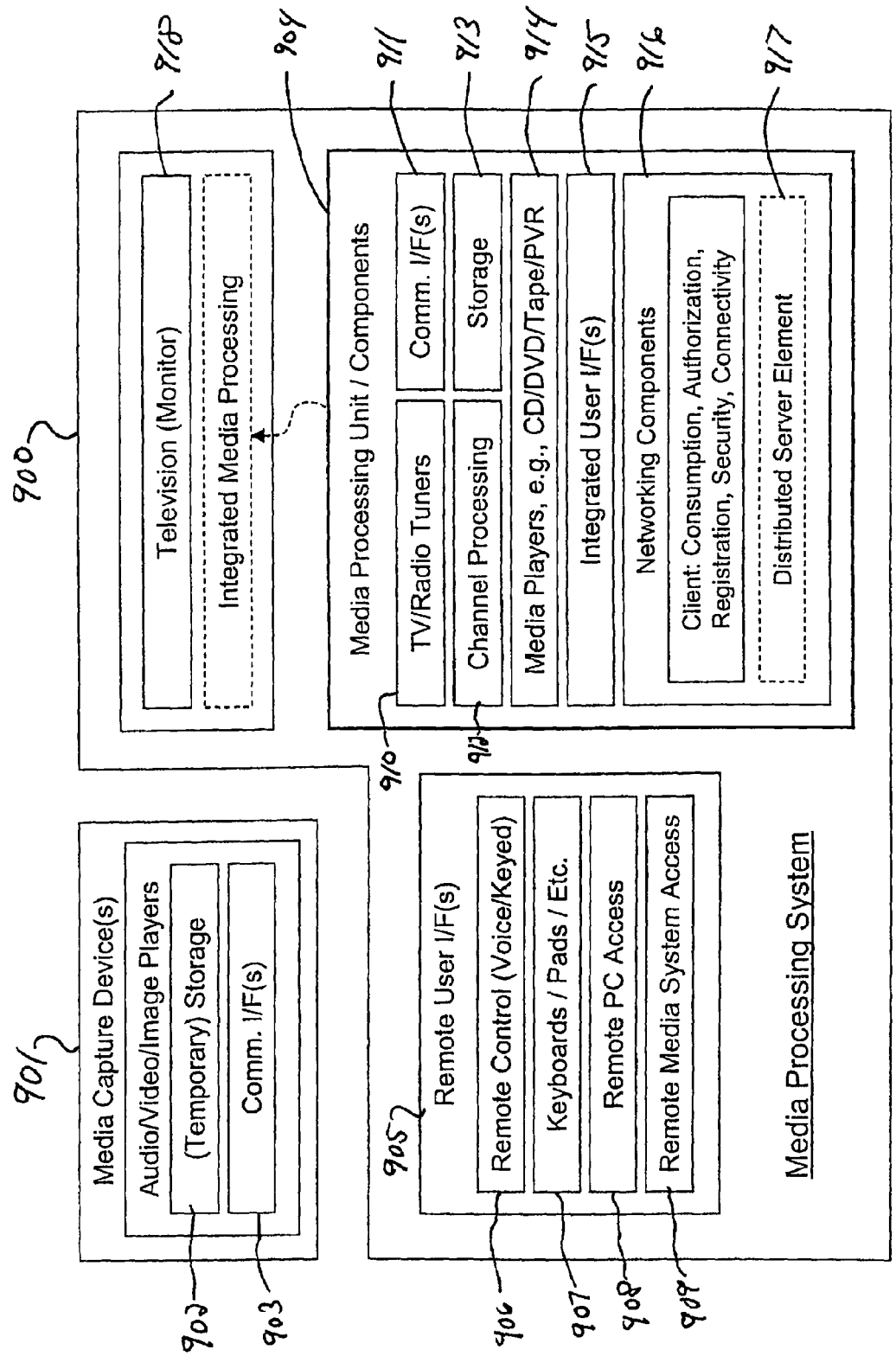
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
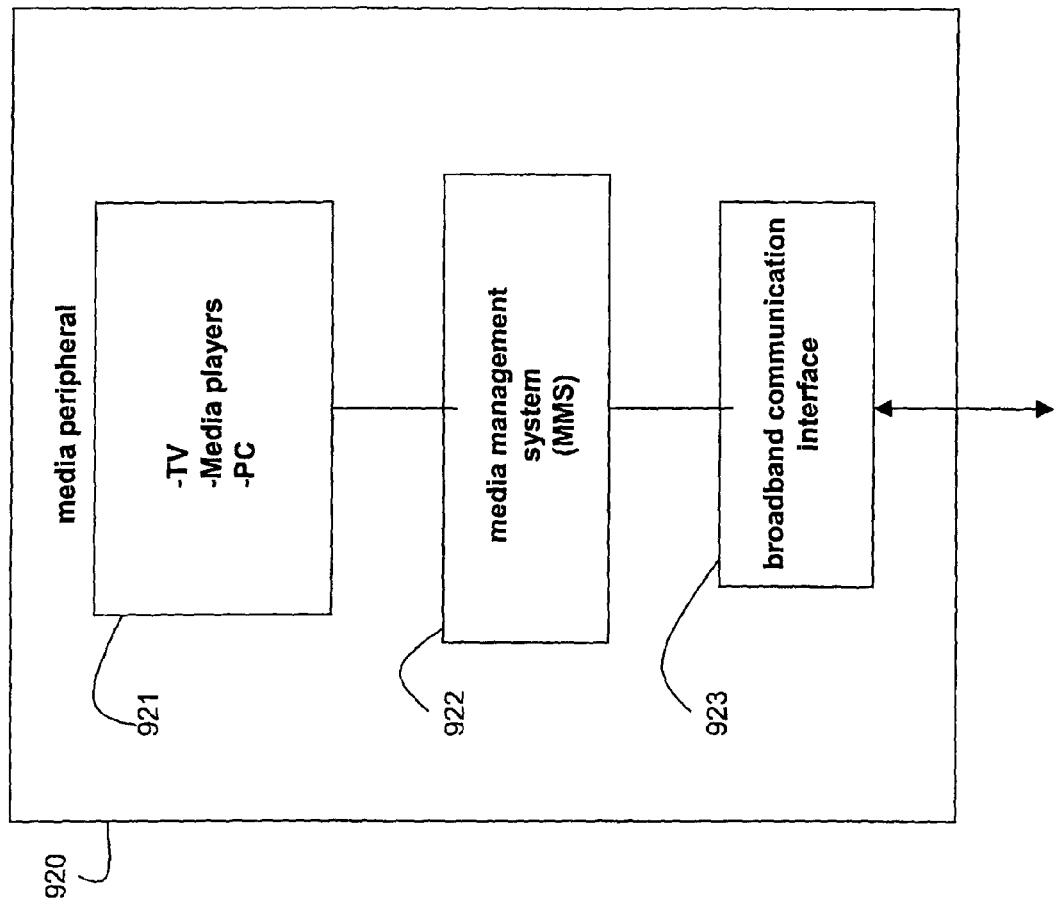
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite head end.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
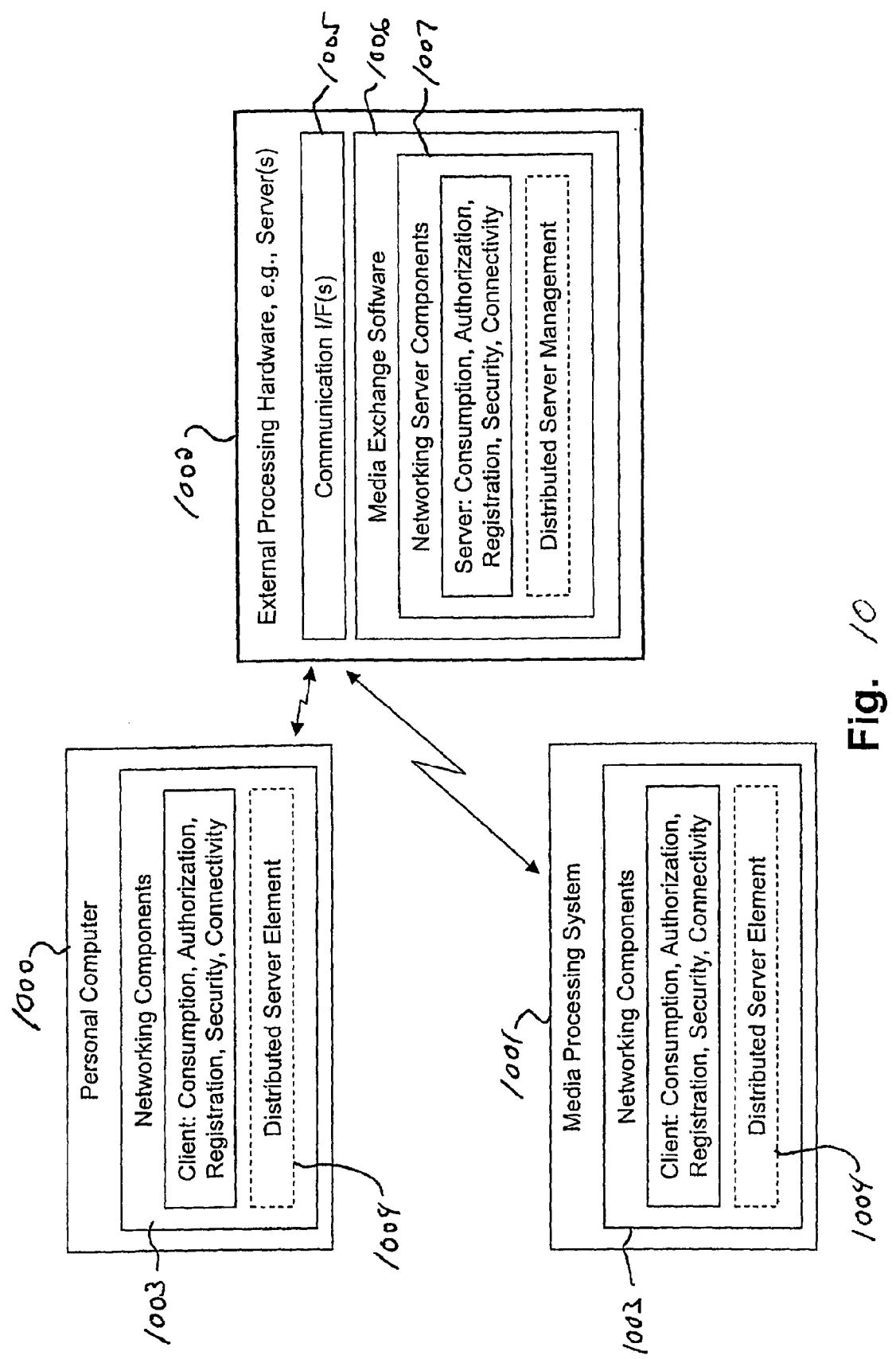
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
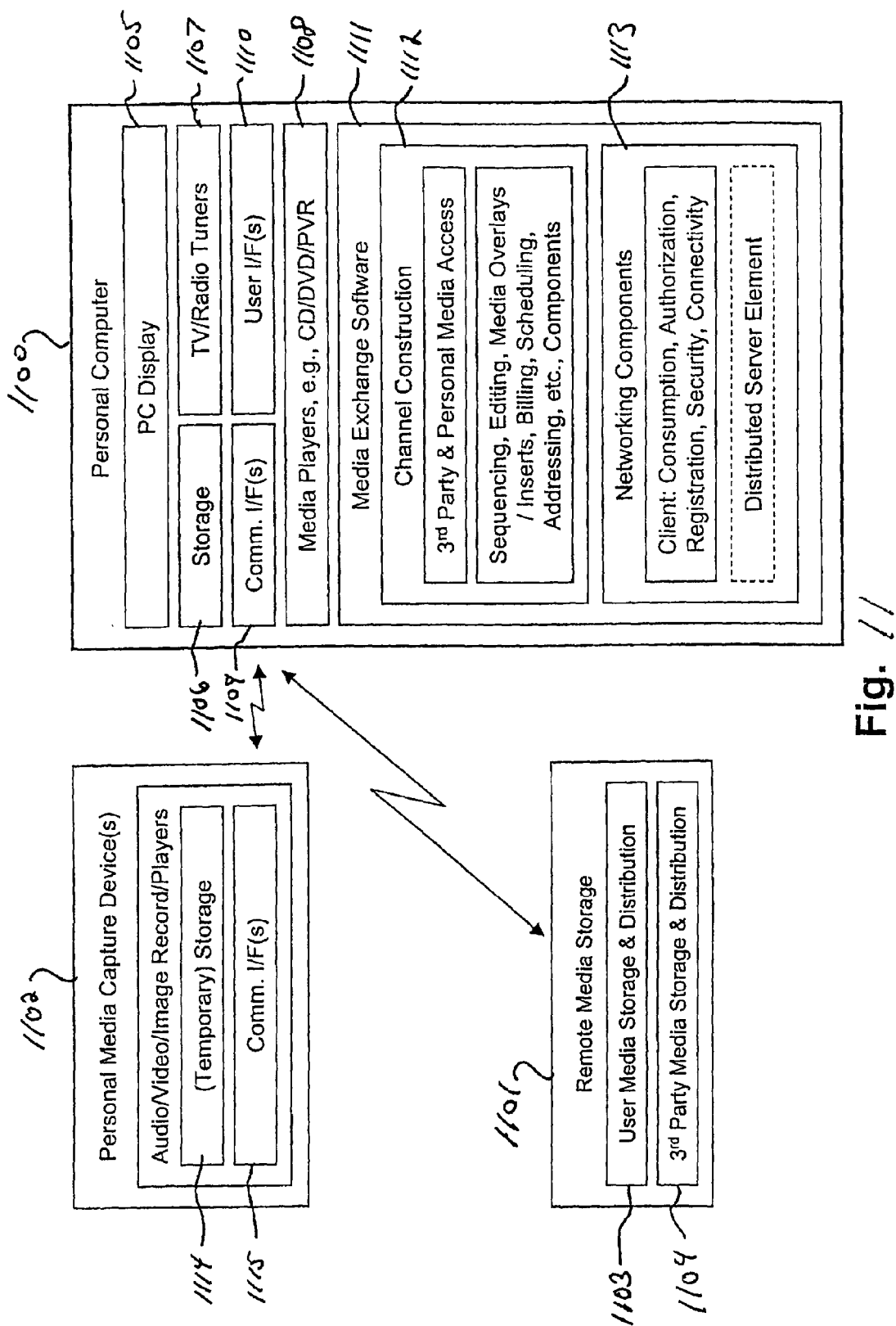
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

In summary, a system and method provide the ability to support the construction of personal media channels by a $3^{rd}$ party media provider, on a media exchange network, based on individual consumer information. The 3rd party media provider may rely on a user profile or user pre-selection to construct a personal media channel for the user containing media content of direct interest to the user.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of supporting media presentation to a viewer via a display, the method comprising:
   retrieving viewing information relating to a viewer based on a viewer profile by a third party provider providing service to the viewer;
   selecting, by the third party provider, a first program from a plurality of first media programs sourced by a first provider, the first program being available upon request and based on the viewer profile;
   selecting, by the third party provider, a second program from a plurality of second media programs sourced by a second provider, wherein the second program is a broadcast program;
   selecting a first playback time for the first program;
   gathering scheduling information based on a first textual description of the first program, a second textual description of the second program, the first playback time for the first program, and a second playback time for the second program; and
   providing, by the third party provider, a tailored television channel guide that is based in part on a simulated television channel containing the first textual description, the first playback time, the second textual description and the second playback time.

2. The method of claim 1, further comprising causing the display of the tailored television channel guide and responding to a selection by the viewer based thereon.

3. The method of claim 1, further comprising causing beginning of playback of the first program at the first time and causing the beginning of playback of the second program at the second time.

4. The method of claim 1, further causing a presentation of the tailored television channel guide.

5. The method of claim 1, wherein the viewer profile includes viewer preferences.

6. The method of claim 1, wherein the viewing information includes data relating to historical viewing behavior.

7. A system supporting a visual presentation on a display, the visual presentation being based on a selection made from available media content, a first portion of the available media content being sourced as a series of broadcast programs in a time scheduled sequence, and a second portion of the available media content being sourced from stored programs at any time and upon demand from storage, the system comprising:
   an interface for a display operable to support deliveries to the display;
   a user input interface operable to gather viewer information based on a viewer profile of a viewer and to provide the viewer information to a third party provider providing content to the viewer, the viewer information being used at least in part in selecting both a first program from the series of broadcast programs from a first provider and a second program from the stored programs from a second provider to construct a simulated television channel by the third party provider, and the first program and the second program respectively having first descriptive text and a second descriptive text;
   a processor operable to cause a visual presentation on the display of a tailored television channel guide that is based in part on the simulated television channel containing the first descriptive text with a first playback time and the second descriptive text with a second playback time; and
   the processor operable via the interface for the display at the first time to cause a beginning of a first visual presentation corresponding to the first program, and operable via the interface for the display at the second time to cause a beginning of a second visual presentation of the second program.

8. The system of claim 7, wherein a delivery pathway for the first program and the second program includes one or more of a cable infrastructure and a satellite network infrastructure.

9. The system of claim 7, wherein a delivery pathway for the first program and the second program includes an Internet pathway.

10. The system of claim 7, wherein the viewer information based on the viewer profile includes viewing history data.

11. The system of claim 7, wherein the viewer information based on the viewer profile includes selected viewing preferences.

12. The system of claim 7, wherein the viewer profile includes one or more of a viewer interest, an age, a hobby, a gender, a viewing history, a genre, a media type, a media format, a media quality, a time, and a media selection.

13. The system of claim 7, wherein the processor is operable to use the viewer information to perform the selection of the second program and to determine the second time.

14. The system of claim 7, wherein the series of broadcast programs comprise channelized broadcasts.

15. The system of claim 7, wherein the second program selected from the stored programs is stored at a first premise remote from a second premise of the display.

16. The system of claim 15, wherein the first premise is a first user's premise and the second premise is a second user's premise.

17. The system of claim 7, wherein the first portion of the available media content is provided by a first service provider via a first pathway, and the second portion of the available media content is provided by a second service provider via a second pathway.

18. The system of claim 7, wherein the simulated television channel represents but one channel of a plurality of channel representations identified via the first visual presentation.

19. The system of claim 7, further comprising a media server to manage delivery of the first and second programs.

20. The system of claim 7, wherein separate delivery pathways are used to deliver the first program and the second program.

\* \* \* \* \*